United States Patent [19]
Gaultier

[11] Patent Number: 6,002,619
[45] Date of Patent: Dec. 14, 1999

[54] MEMORY WITH READ PROTECTED ZONES

[75] Inventor: Jean-Marie Gaultier, Rousset, France

[73] Assignee: SGS-Thomson Microelectornics S.A., Saint Genis, France

[21] Appl. No.: 08/994,889

[22] Filed: Dec. 19, 1997

[30] Foreign Application Priority Data

Dec. 24, 1996 [FR] France .................................. 96 15931

[51] Int. Cl.⁶ .................................................. G11C 7/00
[52] U.S. Cl. ...................... 365/195; 365/189.07; 365/228
[58] Field of Search ............................. 365/195, 189.07, 365/185.04, 228; 395/800.1, 183.18, 185.07

[56] References Cited

U.S. PATENT DOCUMENTS

| | | | |
|---|---|---|---|
| 4,683,553 | 7/1987 | Mollier | 380/4 |
| 4,975,878 | 12/1990 | Boddu et al. | 365/189 |
| 5,452,431 | 9/1995 | Bournas | 395/442 |
| 5,467,081 | 11/1995 | Drews et al. | 340/825.34 |
| 5,542,081 | 7/1996 | Geronimi | 395/800 |
| 5,594,793 | 1/1997 | Bahout | 380/4 |
| 5,729,717 | 3/1998 | Tamada et al. | 395/491 |
| 5,754,762 | 5/1998 | Kuo et al. | 395/186 |
| 5,812,446 | 9/1998 | Tailliet | 365/185.04 |

FOREIGN PATENT DOCUMENTS

| | | | |
|---|---|---|---|
| 2 667 714 | 4/1992 | France | G06K 18/07 |

OTHER PUBLICATIONS

French Search Report from French Patent Application 96 15931, filed Dec. 24, 1996.

*Primary Examiner*—David Nelms
*Assistant Examiner*—Hien Nguyen
*Attorney, Agent, or Firm*—Wolf, Greenfield & Sacks, P.C.

[57] ABSTRACT

The invention relates to memories associated with the central processing units of microcomputers and more particularly, in such memories, to an architecture and device used to protect certain zones of the memory against unauthorized reading operations. The zones of the memory to which access must be authorized to fulfill certain functions are listed by codes recorded in a first memory. Access to these zones is authorized only if the central processing unit gives corresponding codes through a second memory whose contents are compared with those of the first memory. The invention can be applied to microcomputers and microcontrollers, especially those used in mobile telephone sets.

22 Claims, 1 Drawing Sheet

MEMORY WITH READ PROTECTED ZONES

BACKGROUND OF THE INVENTION

1. Field of the Invention

The invention relates to memory associated with the central processing units of microcomputers and more particularly, in such memory, to an architecture and device used to protect certain zones of the memory against unauthorized read operations.

2. Discussion of the Related Art

Microcomputers are used in many applications such as chip-based bank cards and mobile telephone sets. The possibilities offered to users may vary from one user to another depending on the characteristics of the subscription, and the price of a subscription depends on the possibilities to which it gives access.

To minimize the cost of the microcomputers, the microcomputers, also called microcontrollers, used in such applications are designed to fulfill all the functions available, however access to these functions is limited depending on the type of subscription. The limiting of access to certain functions is done during the manufacturing process through the prohibition of access to certain zones of the memory that correspond to functions not paid for in the subscription.

The zones of the memory that correspond to functions of the subscription that has been paid for may be identified by the codes C1, C2, C3, . . . , CN so that, broadly speaking, a code C1 corresponds to the enjoyment of basic functions while the code CN corresponds to the enjoyment of all the functions available.

It is important to prevent fraudulent identification of these codes C1 to CN. Such identification would allow access to all the functions available with CN, while requiring payment only for the subscription that corresponds to the basic functions, i.e., C1.

SUMMARY OF THE INVENTION

An aim of the present invention therefore is to obtain a memory associated with a central processing unit of a microcomputer or microcontroller in which all or only some zones of the memory are protected against unauthorized reading operations.

The invention therefore relates to a method for reading a memory of a central processing unit of a microcomputer with which there are associated circuits for addressing the cells of the memory and circuits for reading the signals read in the cells of the memory selected by the addressing circuits, wherein the method comprises the following steps:

(a) organizing the memory into zones, each zone corresponding to the cells to which the central processing unit must have access to fulfill all or part of a determined function;

(b) assigning to each zone defined by the step (a) a code that is different from one zone to the next one;

(c) recording all or a part of the codes of zones defined by step (b) in a first memory;

(d) recording all or part of the codes defined by step (b) in a second memory, the number of codes recorded in this second memory depending on the functions designed to be carried out by the central processing unit;

(e) comparing codes recorded in the first and second memories; and (f)—if the compared codes are identical, authorizing access to the memory by the central processing unit for the zones corresponding to identical codes recorded in the first and second memories;

—if the compared codes are not identical, prohibiting access to the memory by the central processing unit for the zones corresponding to the codes of the first memory which are not identical to the codes of the second memory.

Step (c) may consist of recording a part of the codes of the zones defined by step (b) in the first memory, the recorded codes corresponding to the zones to which access must be permitted, the other non-recorded zones corresponding to the zones to which access is free.

Step (d) is performed by the central processing unit whenever the central processing unit is put into operation or initialized.

To perform step (d), the central processing unit must have a memory to record the codes corresponding to the protected zones to which this unit must have access in order to carry out the planned functions.

The invention also relates to a device for the reading of a memory to implement the method defined above. The device comprises a first memory in which there are recorded all the codes of zones defined by step (b); a second memory in which there are recorded the codes of zones corresponding to the zones to which the central processing unit must have access to carry out the planned functions and a comparator circuit having input terminals connected to the output terminals of the first and second memories to compare the codes contained in the first and second memories and give a different signal depending on whether or not the codes compared are identical, the signal being used, through the addressing circuits, to permit or not permit access to the memory at the zone defined by one of the codes contained in the first memory.

In another aspect of the invention, a device for reading a central processing unit memory of a microcomputer has a circuit for addressing zones of the memory and a circuit for reading the zones of the memory selected by the addressing circuits, wherein each of the zones includes a code corresponding to a different function which may be performed by the central processing unit. The device includes a first memory which stores each of the codes stored in the central processing unit memory, a second memory which stores a number of the codes, the number of codes corresponding to a number of functions designated to be carried out by the central processing unit and a comparing circuit which compares the codes stored in the first memory with the codes stored in the second memory and outputs to the addressing circuit only codes which are stored in both the first memory and the second memory. The addressing circuit, based on the comparing circuit output, provides access to the codes of the memory by the central processing unit, such that the central processing unit is able to perform the functions which correspond to the codes output by the comparing circuit.

According to another aspect of the invention, a device prevents unauthorized reading of a memory of a central processing unit. The central processing unit memory comprises a plurality of zones, each zone including a code corresponding to a function which can be performed by the central processing unit. The device comprises an input for inputting to the central processing unit a set of the codes which correspond to a predetermined number of functions which the central processing unit is authorized to access, a first storage device for storing all of the codes stored in the central processing unit memory, a second storage device for storing the set of codes corresponding to the predetermined number of functions, a comparator for comparing the codes stored in the first storage device with the set of codes stored in the second storage device and outputting a signal which identifies the codes in the second storage device which are identical to the codes in the first storage device and an addressing device for allowing access to the central processing unit memory by the central processing unit for codes identified in the output signal. The set of codes is transmitted to the second storage device when the central processing unit is initialized.

According to another aspect of the invention, a method is implemented to protect a memory of a central processing unit from unauthorized read operations. The method comprising the steps of storing a number of codes in a first memory, each of the number of codes corresponding to a function which may be performed by the central processing unit, storing a subset of the number of codes in a second memory, the subset of codes corresponding to designated functions which the central processing unit is allowed to access from the central processing unit memory, comparing the codes stored in the first memory with the subset of codes stored in the second memory to determine which codes in the first memory are identical to the codes in the second memory and outputting a signal which identifies the identical codes and allowing the central processing unit access only to the codes which have been identified as identical. The method further comprises transmitting the subset of codes to the second memory when the central processing unit is initialized and loading the subset of codes into the central processing unit with a memory card.

BRIEF DESCRIPTION OF THE DRAWING

The invention shall be understood more clearly from the following description of a particular exemplary embodiment, the description being made with reference to the single appended drawing, wherein.

DETAILED DESCRIPTION

Figure 1:
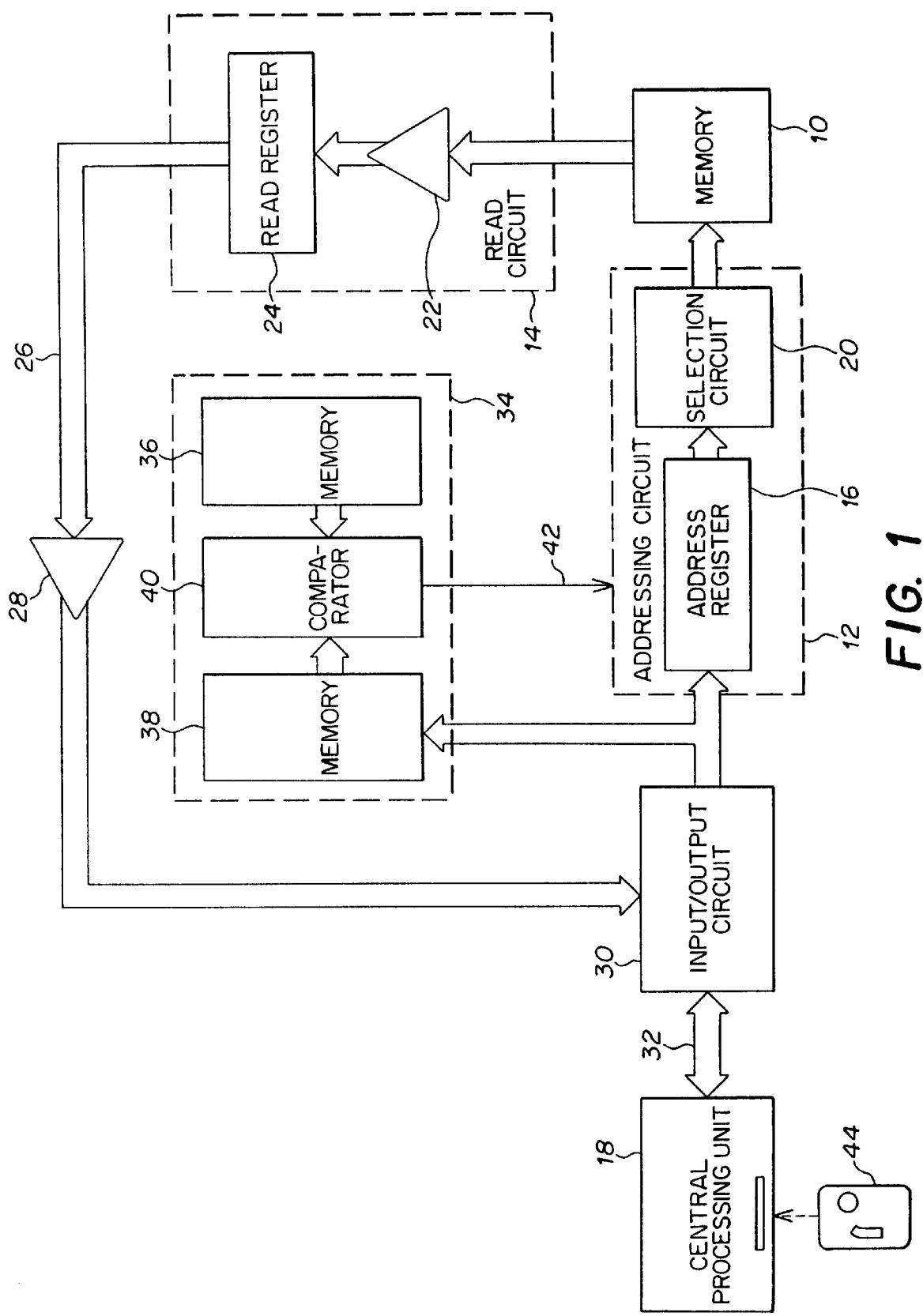
FIG. 1 is a block diagram of a memory according to the present invention.

As shown in FIG. 1, each memory 10 associated with a central processing unit 18 of a microcomputer (not shown) has a circuit 12 for addressing the cells or compartments of the memory 10 and a read circuit 14 for reading the signals coming from the cells or compartments selected by the addressing circuit 12.

The addressing circuit 12 essentially comprises an address register 16 which receives the addressing code of the memory given by the central processing unit 18 and a selection circuit 20 that consists of circuits for decoding the addressing code.

The read circuit 14 essentially comprises a read amplifier 22 which amplifies the signals given by the cells or compartments selected and a read register 24 that makes a recording in binary form of the signals read. The binary contents or data of the read register 24 are transmitted to the central processing unit 18 by means of a one-way bus 26, output amplifier 28 and an input/output circuit 30.

The input/output circuit 30 is not only the route for the data contained in the read register 24, as has just been described, but also for the addressing codes, and is therefore connected to the central processing unit 18 by a two-way bus 32. With the memory 10, there are also associated recording circuits for the memory cells or compartments that are not shown or described for they do not come into play in the present invention which relates only to the reading of the memory 10.

To implement the invention, the addressing circuits 12 are supplemented by a device 34 which includes a first memory 36 of codes of zones of the memory 10, a second memory 38 and a comparator 40. The first memory 36, which is of a permanent type, may consist of as many registers as there are zone or sector codes of the memory 10. Each register has output terminals that are connected to a first series of input terminals of the comparator 40. It also has input terminals (not shown) used to record the codes of the zones of the memory 10 by known means.

The second memory 38, which is of a volatile type, may also consist of registers and input terminals that are connected to the central processing unit 18 by means of the input/output circuit 30. The second memory 38 also comprises output terminals that are connected to a second series of input terminals of the comparator 40. The comparator 40 has an output terminal 42 that is connected to the addressing circuits 12.

Each register of the memory 36 contains a zone or sector code of the memory 10, and this code may correspond to the most significant digits of the addressing codes of the memory 10 or to an encryption of these most significant digits to increase security against fraud. Some of these codes or keys correspond to zones of the memory 10 that are assigned to the performance of standard or basic functions while others are assigned to the performance of particular functions.

In the case of a microcomputer for a mobile telephone, these particular functions may be, for example, abbreviated dialing, the reception and recording of a message, the reception and recording of a fax, etc.

According to the invention, these zones corresponding to these particular functions will not be accessible by the central processing unit 18 unless this unit gives the keys which correspond to the particular functions. To this effect, these keys are transmitted by the central processing unit 18 whenever the system is started up, and are recorded in the second memory 38. These keys thus transmitted are compared, in the comparator 40, with the keys contained in the memory 36. Comparator 40 then gives, at the output terminal 42, signals corresponding to matching codes, each signal having the effect of releasing access to the zone of the memory 18 corresponding to the matching key.

The keys transmitted by the central processing unit 10 are "entered" into it when the system is customized according to the functions to which the user is entitled following the specifications of the subscription paid for by the user.

This entry of the keys into the central processing unit 18 may be carried out by means of a memory card 44 or by any other means. These keys must be present in the central processing unit 18 whenever operation is begun and consequently must be stored therein by the memory card 44 permanently or introduced therein whenever the operation is begun.

The use of the keys of the memory described here above enables access to the memory 10 only if the central processing unit 18, whenever the system is started up or initialized, transmits the particular keys of the zones that must be used for efficient operation of the system. When there is no recognition of these keys, the system cannot work properly.

In the above description, it has been assumed that there are as many keys as there zones of the memory. However, this may lead to memories 36 and 38 being very large, sometimes requiring additional circuits on the substrate of the memory 10, which is more costly. Hence, the zones of the memory 10 that correspond to standard or basic functions need not comprise any keys, the keys being reserved for the zones assigned to the performance of the particular functions. Thus, the capacities of the memories 36 and 38 will be determined by the number of keys corresponding to the zones reserved for the particular functions.

If there is no key for a memory zone, this zone will be considered to be freely accessible.

The description of the invention that has just been made with reference to the single figure enables the definition of the following steps of a method for reading the memory 10:

(a) organizing the memory 10 into zones, each zone corresponding to the cells to which the central processing unit 18 must have access to perform all or part of a determined function;

(b) assigning to each zone defined by step (a) a code that is different from one zone to the next zone;

(c) recording all or a part of the codes of the zones defined by step (b) in a first memory 36;

(d) recording all or part of the codes defined by step (b) in a second memory 38, the number of codes recorded in this second memory depending on the functions designed to be carried out by the central processing unit 18;

(e) comparing the codes recorded in the first memory 36 and the second memory 38; and (f)—if the compared codes are identical, authorizing access to the memory 10 by the central processing unit 18 for the zones corresponding to identical codes recorded in the first memory 36 and the second memory 38; or if the compared codes are not identical, prohibiting access to the memory 10 by the central processing unit 18 for the zones corresponding to the codes of the first memory which are not identical to the codes of the second memory 38.

The first memory 36 is designed to record only codes that correspond to zones to which access is permitted to enable the operation of certain functions. The other codes of zones that correspond to authorized basic functions are not recorded in this memory 36.

Protection against access to unauthorized functions is obtained by seeing to it that step (d), recording codes in the second memory 38 is performed whenever the central processing unit 18 is put into operation during the initialization of the system.

To this end, the central processing unit 18 stores the codes that it transmits to the second memory 38, and this storage is done during customizing of the central processing unit 18 to take account of the functions permitted to the user. This customization can be obtained by a memory card 44 whose contents are "loaded" into the central processing unit 18 whenever the unit is started up. The two memories 36 and 38 may be obtained by registers, but these registers must be of a permanent type for the memory 36 and of a volatile type for the memory 38, the term "volatile" meaning that the contents of the registers disappear when there is no electrical supply.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for reading a memory of a central processing unit of a microcomputer with which there are associated circuits for addressing cells of said memory and circuits for reading the cells of said memory selected by said addressing circuits, wherein said method comprises the steps of:

(a) organizing the memory into zones, each zone corresponding to cells to which the central processing unit must have access to perform at least part of a corresponding one of a number of determined functions;

(b) assigning, to each zone defined by step (a), a code, each of said codes corresponding to a function;

(c) storing codes assigned in step (b) in a first memory;

(d) storing codes defined in a second memory, the codes stored in the second memory depending on functions designated to be carried out by the central processing unit;

(e) comparing the codes stored in the first memory with the codes stored in the second memory; and (f) authorizing access to the memory by the central processing unit for the zones corresponding to identical codes stored both in the first and second memories; and prohibiting access to the memory by the central processing unit for the zones corresponding to codes stored in the first memory which are not identical to codes stored in the second memory.

2. The method according to claim 1, wherein step (c) includes storing part of the codes of the zones defined by step (b) in the first memory, said stored codes corresponding to the zones to which access must be permitted, while other, non-recorded zones correspond to zones to which access is free.

3. The method according to claim 1, wherein step (d) is performed by the central processing unit whenever the central processing unit is put into operation or initialized.

4. The method according to claim 3, further comprising the step of storing, in a memory of the central processing unit, the codes corresponding to the zones to which the processing unit must have access to carry out designated functions.

5. The method according to claim 4, wherein storing of the memory access codes in the memory of the central processing unit is done with a memory card.

6. The method according to claim 2, wherein step (d) is performed by the central processing unit whenever the central processing unit is put into operation or initialized.

7. The method according to claim 6, further comprising the step of storing, in a memory of the central processing unit, the codes corresponding to the zones to which the processing unit must have access to carry out the planned designated functions.

8. The method according to claim 7, wherein the storing of the memory access codes in the memory of the central processing unit is done with a memory card.

9. A device for reading a central processing unit memory of a microcomputer having a circuit for addressing zones of said memory and a circuit for reading the zones of the memory selected by the addressing circuits, wherein each of said zones includes a code corresponding to a different function which may be performed by said central processing unit, said device comprising:

a first memory which stores each of said codes corresponding to the zones of said central processing unit memory;

a second memory which stores a number of second codes, said second codes corresponding to functions designated to be carried out by the central processing unit; and a comparing circuit which compares the codes stored in said first memory with the second codes stored in the second memory and outputs to said addressing circuit only codes which are stored in both the first memory and the second memory;

wherein said addressing circuit, based on said comparing circuit output, provides access to the zones of said memory by the central processing unit, such that said central processing unit is able to perform the functions which correspond to said codes output by said comparing circuit.

10. The device of claim 9, wherein first memory is of a permanent register type.

11. The device of claim 10, wherein said second memory is of a volatile register type.

12. The device of claim 11, wherein said second codes corresponding to said number of functions designated to be carried out by the CPU are loaded into the central processing unit by means of a memory card.

13. A device for preventing unauthorized reading of a memory of a central processing unit, said central processing unit memory comprising a plurality of zones, each zone including a code corresponding to a function which can be performed by the central processing unit, the device comprising:

inputting means for inputting to said central processing unit a set of codes which correspond to a predetermined number of functions which the central processing unit is authorized to access;

first storage means for storing the codes corresponding to zones in said central processing unit memory;

second storage means for storing said set of codes corresponding to said predetermined number of functions;

comparing means for comparing the codes stored in said first storage means with the set of codes stored in said second storage means and outputting a signal which identifies codes in the second storage means which are identical to codes in the first storage means; and addressing means for allowing access to zones of said central processing unit memory by said central processing unit for codes identified in said output signal.

14. The device of claim 13, wherein said first storage means comprises a permanent nonvolatile memory.

15. The device of claim 13, wherein said second storage means comprises a volatile memory which is cleared when power to said central processing unit is disconnected.

16. The device of claim 13 wherein said inputting means comprises a memory card which loads said set of codes into said central processing unit.

17. The device of claim 13, wherein said comparing means comprises a comparator having inputs coupled to said first storage means to receive said stored codes and inputs coupled to said second storage means to receive said stored set of codes and an output for outputting said output signal.

18. The device of claim 13, wherein said addressing means comprises an address register which, in response to said output signal, addresses the zones of said central processing unit memory corresponding to the codes identified in the output signal to allow the central processing unit access to functions that the codes represent.

19. The device of claim 16, wherein said set of codes is transmitted to the second storage means when said central processing unit is initialized.

20. A method for protecting a memory of a central processing unit from unauthorized read operations, the method comprising the steps of:

storing codes in a first memory, each of said codes corresponding to a function which may be performed by said central processing unit;

storing a portion of said codes in a second memory, said portion corresponding to designated functions which the central processing unit is allowed to access from said central processing unit memory;

comparing said codes stored in said first memory with said portion of said codes stored in said second memory to determine which codes in said first memory are identical to codes in said second memory and outputting a signal which identifies the identical codes; and allowing the central processing unit access only to functions corresponding to codes which have been identified as identical.

21. The method of claim 20, further comprising transmitting said portion of said codes to said second memory when said central processing unit is initialized.

22. The method of claim 21, further comprising loading said portion of said codes into said central processing unit with a memory card.

* * * * *

UNITED STATES PATENT AND TRADEMARK OFFICE
CERTIFICATE OF CORRECTION

PATENT NO.    :   6,002,619
DATED         :   December 14, 1999
INVENTOR(S)   :   Jean-Marie Gaultier It is certified that error appears in the above-identified patent and that said Letters Patent is hereby corrected as shown below:

On the title page, item [73] should read:

[73] assignee:   SGS-Thomson Microelectronics S.A.,
                 Saint Genis, France Column 4, lines 43 and 44 should read:

Memory 10 corresponding to the matching key.
    The keys transmitted by the central processing unit 18 are Signed and Sealed this First Day of August, 2000

Attest:

Q. TODD DICKINSON

*Attesting Officer*           *Director of Patents and Trademarks*